United States Patent [19]
Kagawa

[11] Patent Number: 5,452,474
[45] Date of Patent: Sep. 19, 1995

[54] EXTERNALLY ATTACHED HANDSET OF AN END TERMINAL USED FOR MOBILE COMMUNICATION SYSTEMS

[75] Inventor: Tetsuya Kagawa, Zama, Japan

[73] Assignee: Ricoh Company, Ltd., Tokyo, Japan

[21] Appl. No.: 181,444

[22] Filed: Jan. 14, 1994

Related U.S. Application Data

[63] Continuation of Ser. No. 958,789, Oct. 9, 1992, abandoned.

[30] Foreign Application Priority Data

Oct. 14, 1991 [JP] Japan .................. 3-264220

[51] Int. Cl.⁶ .............. H04B 1/48; H04N 1/32; H04M 1/21
[52] U.S. Cl. .............................. 455/89; 455/66; 455/79; 379/96; 379/100; 379/110; 358/468
[58] Field of Search ............... 455/73, 74, 78, 79, 455/89, 90, 66, 93, 63; 379/58–61, 63, 96–98, 110, 93, 100; 358/442, 468, 434–439, 441

[56] References Cited

U.S. PATENT DOCUMENTS

| | | | |
|---|---|---|---|
| 4,481,382 | 11/1984 | Villa-Real | 379/61 |
| 4,623,758 | 11/1986 | Batla et al. | 379/88 |
| 4,716,576 | 12/1987 | Sakai et al. | 455/79 |
| 4,881,129 | 11/1989 | Mitsuhashi | 379/100 |
| 4,922,546 | 5/1990 | Takahashi | 455/74 |
| 4,956,876 | 9/1990 | Koshiishi | 455/78 |
| 4,977,609 | 12/1990 | McClare | 455/78 |
| 5,097,187 | 3/1992 | Koshiishi | 318/280 |
| 5,200,991 | 4/1993 | Motoyanagi | 379/61 |
| 5,216,520 | 6/1993 | Omura et al. | 358/442 |
| 5,239,576 | 8/1993 | Yoshida et al. | 379/100 |
| 5,249,218 | 9/1993 | Sainton | 379/59 |

FOREIGN PATENT DOCUMENTS 0023241 1/1987 Japan .................. 455/89

Primary Examiner—Chi H. Pham
Assistant Examiner—Mark D. Wisler
Attorney, Agent, or Firm—Oblon, Spivak, McClelland, Maier & Neustadt

[57] ABSTRACT

An externally attached handset connected between an end terminal of a mobile communication system and a data communication end terminal which handset is connected via a speaker/microphone terminal on the end terminal of the mobile communication system. The handset comprises a speaker, a microphone, a detecting device detecting a data communication signal, and an on/off circuit device which automatically disconnects a microphone from a microphone signal line when data communication is performed. The handset may further includes a display device which indicates that data communication is being performed.

17 Claims, 8 Drawing Sheets

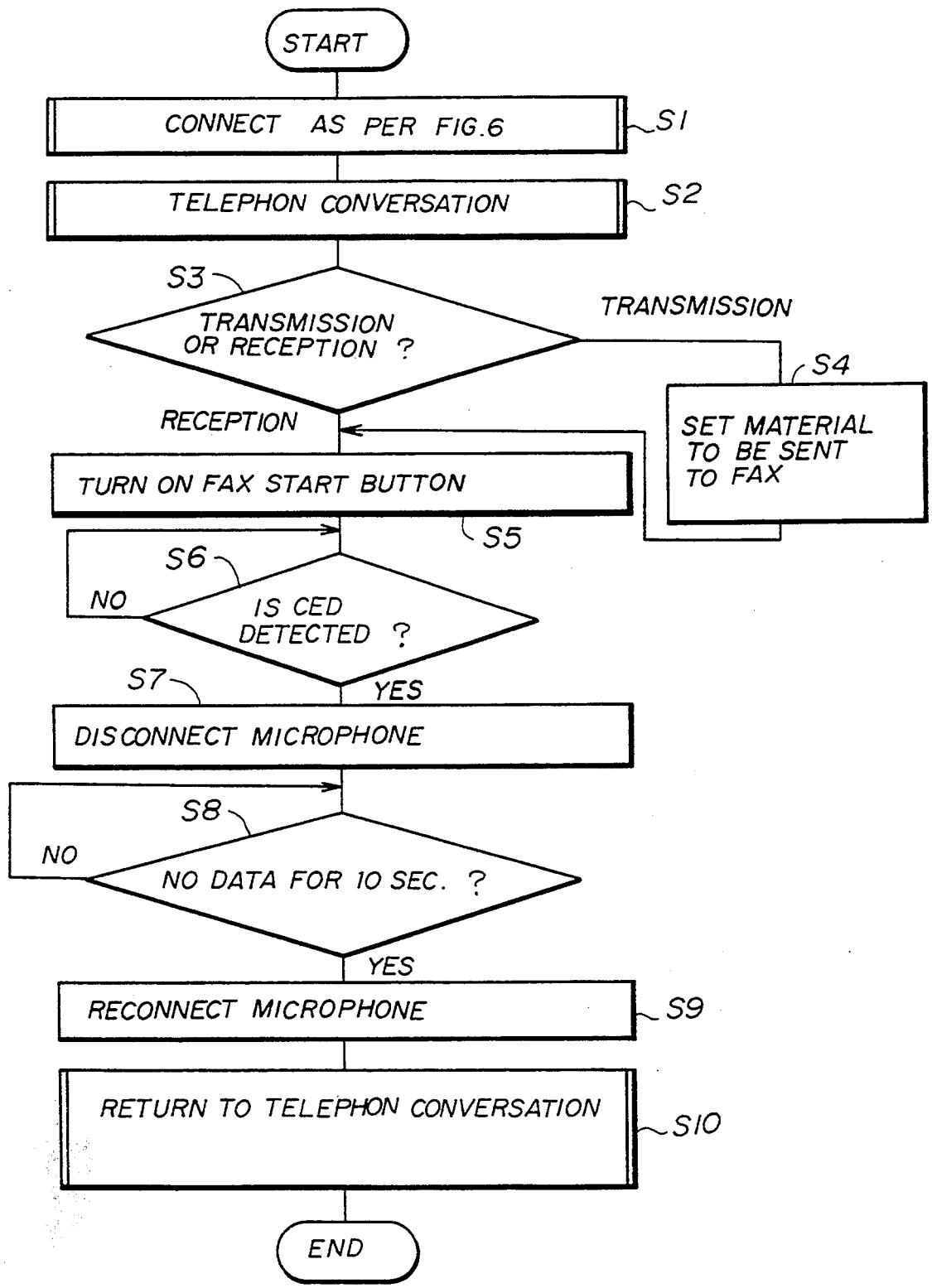

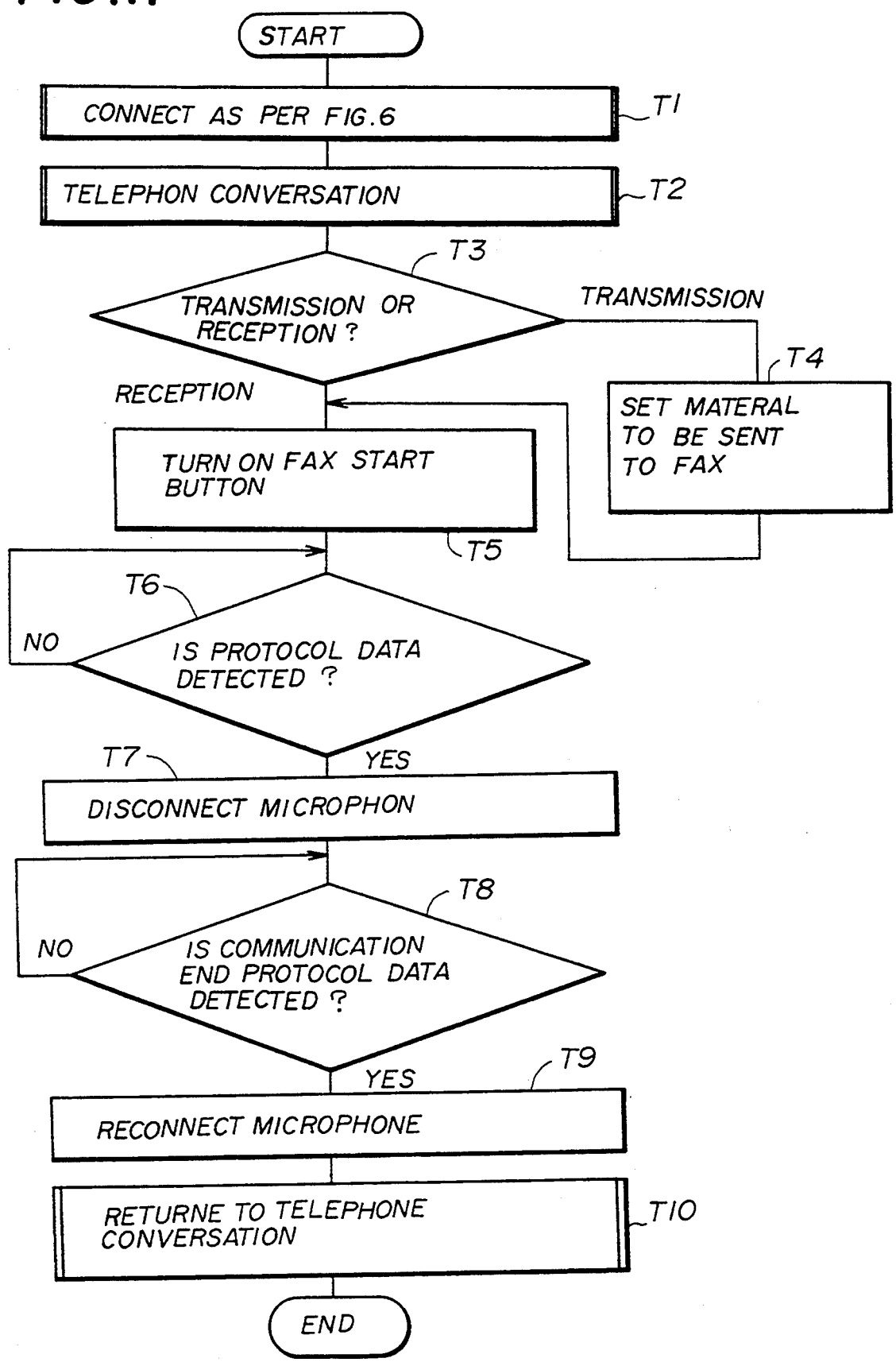

FIG.12A

FACSIMILE SIGNAL WAS RECEIVED.
PRESS START BUTTON TO START
FACSIMILE COMMUNICATION.

FIG.12B

START FACSIMILE TRANSMISSION.
INSERT MATERIAL AND PRESS
START BUTTON.

FIG.12C

FACSIMILE RECEPTION STARTED.
WAIT FOR A MOMENT.

EXTERNALLY ATTACHED HANDSET OF AN END TERMINAL USED FOR MOBILE COMMUNICATION SYSTEMS

This application is a continuation of U.S. application Ser. No. 07/958,789, filed on Oct. 9, 1992, now abandoned.

BACKGROUND OF THE INVENTION

1. Field of the Invention

The present invention relates to an externally attached handset of an end terminal used for mobile communication systems, and more particularly to an externally attached handset of an end terminal used for a portable radiotelephone or an automobile telephone connected with a facsimile machine.

2. Discussion of the Background

In recent years, mobile communication systems, for example, portable radiotelephones and automobile telephones, have become widely used. With the spread of such systems, demand for facsimile communication via mobile communication systems has been increasing. Accordingly, a NCU (network control unit) used for connecting a data communication terminal, such as a facsimile device that communicates non-audio data, to a portable radiotelephone or an automobile telephone has become commercially available.

In such NCUs, one for automobile telephones adopts a system wherein a NCU is connected between a radio device (a main body of an automobile telephone) and a handset. By this connection, regular telephone conversations can be done by using a handset, and transmission and reception of a facsimile can be performed by turning on the facsimile machine and turning on the communication start button during the telephone conversation, if necessary.

On the other hand, a NCU used for portable radiotelephones is different from that for the automobile telephones. The NCU cannot be connected between a radio device and a handset since the radio device and the handset of the portable radiotelephone are incorporated in one body. For this reason, a facsimile device is connected to the handset of the portable radiotelephone via a speaker/microphone terminal equipped for connecting a headphone so as to perform transmission and reception of facsimile data.

FIG. 1 shows an example of a conventional portable radiotelephone with a headphone connected to a speaker/microphone terminal. Regularly, in a state where a headphone 14 is not connected, conversation is made with a speaker 13 and a microphone 12 provided on the portable radiotelephone 11. The portable radiotelephone 11 has a jack 15 (speaker/microphone terminal) for connecting a plug of the headphone 14. When the plug of the headphones 14 is inserted into the jack 15, the speaker 13 and the microphone 12 on the portable radiotelephone 11 switch off and telephone conversation can be done only with a speaker 16 and a microphone 17 of the headphones 14.

When connecting a data communication end terminal, such as a facsimile machine, to the portable radiotelephone 11, as shown in FIG. 2, commercially available NCU 21 for portable radiotelephones are required. The NCU 21 may have a jack for connecting the headphones 14, as shown in the figure, or a monitor speaker, not shown in the figure. Major functions of the NCU 21 are two-wire/four-wire conversion, transmission level adjustment, reception level adjustment, impedance matching, TEL/FAX switching and detection of closed loop, explained in the following.

As is well known, two-wire/four-wire conversion is required, as the signal line at the jack 15 of the portable radiotelephone 11 is a four-wire one while a regular facsimile machine adopts a two-wire line for input.

The closed loop detection is for switching the signal line to either TEL or FAX by detecting a DC current present when a closed loop for facsimile line is formed. The closed loop is formed when a handset of the facsimile machine is taken off hook or when a TEL/FAX switch on the facsimile device is switched to FAX. FIG. 3 shows a block diagram of a part of the NCU 21, which part performs a switching of the TEL/FAX functions. Usually, a relay 23 is switched to the TEL side and telephone conversation is performed via the headphones 14. A controller 24 continues to detect a formation of the closed loop during communication via conversation.

As shown in FIG. 4, a relay R on the facsimile machine is usually switched to the TEL side. The relay R is switched to FAX when the handset of the facsimile machine is taken off hook or when the TEL/FAX switch of the facsimile machine is switched to FAX. If the closed loop is detected, it is judged that facsimile communication is started and the relay 23 is switched to the FAX side. However, regular facsimile machines used for mobile communication systems do not have a handset because portable radiotelephones and automobile telephones include handsets.

FIG. 5 is a flow chart of operation of a switching function performed by the NCU 21. In step P1, the controller 24 checks whether or not a closed loop is formed, by detecting whether or not a DC current is present at a jack to which the facsimile machine is connected. If it is judged that the closed loop is formed, the procedure proceeds to step P2 where the relay 23 of the NCU 21 is switched to the FAX side. In step P3, it is judged whether or not the closed loop is still formed. If the closed loop is not formed, the relay 23 is switched to the TEL side in step P4, and the procedure ends.

However, the above mentioned conventional system has a disadvantage in that an operation for using a facsimile machine is complicated. That is, the NCU 21 is allowed to be connected only when facsimile communication is to be performed, and after the connection a start switch of the facsimile machine has to be operated. This is because when the NCU 21 is connected via the jack 15, the speaker 13 and the microphone 12 of the portable radiotelephone 11 are off the line, which leads to a situation such that telephone conversation cannot be performed.

For example, as shown in FIG. 2, in case using the NCU 21, which can be used with the headphones 14, when starting facsimile communication, firstly a plug of the connection line of the NCU 21 is inserted into the jack 15 of the portable radiotelephone 11. After that, the user must put the headphones 14 on his head and conduct a conversation. When completion of preparation for facsimile communication is confirmed with the opposite side, the user must turn the start switch on. This procedure is very inconvenient for the user.

Additionally, if facsimile communication is started by mistake, time elapses until the facsimile communication ends and thus is wasted. This is because while the system is in a facsimile communication mode, the relay 23 is switched to the FAX side, which does not permit monitoring the communication by the headphone 14.

In case a NCU having a monitor speaker is used, a voice from the remote party can be heard but a voice from one's own side cannot be sent to the remote party. Accordingly, it is required that a plug be inserted each time when performing facsimile communication, and thus a disadvantage still exists.

SUMMARY OF THE INVENTION

It is a general object of the present invention to provide a novel and useful externally attached handset in which the above mentioned disadvantages are eliminated.

A more specific object of the present invention is to provide an externally attached handset which is connected between an end terminal of a mobile communication system and a data communication end terminal, and is able to switch between telephone communications and data communications while a data communication end terminal is connected to the end terminal of the mobile communication system.

In order to achieve the above mentioned objects, an externally attached handset according to the present invention, connected between an end terminal of a mobile communication system having a speaker/microphone terminal by means of which an externally attached speaker and microphone are connected, and a data communication end terminal connected to the end terminal of the mobile communication system via the speaker/microphone terminal, comprises:

- a speaker signal line connecting the end terminal of the mobile communication system to the data communication end terminal via the speaker/microphone terminal;
- a microphone signal line connecting the end terminal of the mobile communication system to the data communication end terminal via the speaker/microphone terminal;
- a speaker, connected to the speaker signal line, converting a signal on the speaker signal line into an audio sound;
- a microphone, connected to the microphone signal line, converting a sound into a sound signal and supplying the sound signal to the microphone signal line;
- a detecting means for detecting a data communication signal on the speaker signal line and the microphone signal line; and
- an on/off circuit device, connected between the microphone and the microphone signal line, disconnecting the microphone from the microphone signal line when a data communication signal is detected by the detecting means on the speaker signal line or the microphone signal line.

According to the present invention, since the microphone is turned on and off according to the presence or absence of a data communication signal, telephone communication and data communication can be automatically switched from one to the other, as needed. Accordingly, sound signals generated by the microphone of the externally attached handset are not mixed with data communication signals while data communication is performed, and monitoring of the communication can be done by means of the speaker provided on the handset. Thus, telephone conversation and data communication can be performed while a data communication end terminal is connected to the end terminal of a mobile communication system via the handset; this results in improved operation of the end terminal of data communications connected to the end terminal of a mobile communication system.

Other objects, features and advantages of the present invention will become more apparent from the following detailed description when read in conjunction with the accompanying drawings.

BRIEF DESCRIPTION OF THE DRAWINGS

FIG. 10 is a flow chart of a communication procedure of a first embodiment of the present invention;

FIG. 11 is a flow chart of a communication procedure of a second embodiment of the present invention; and FIGS. 12A, 12B, 12C are views showing examples of instructions displayed on a displaying device.

DETAILED DESCRIPTION OF THE PREFERRED EMBODIMENTS

Figure 1:
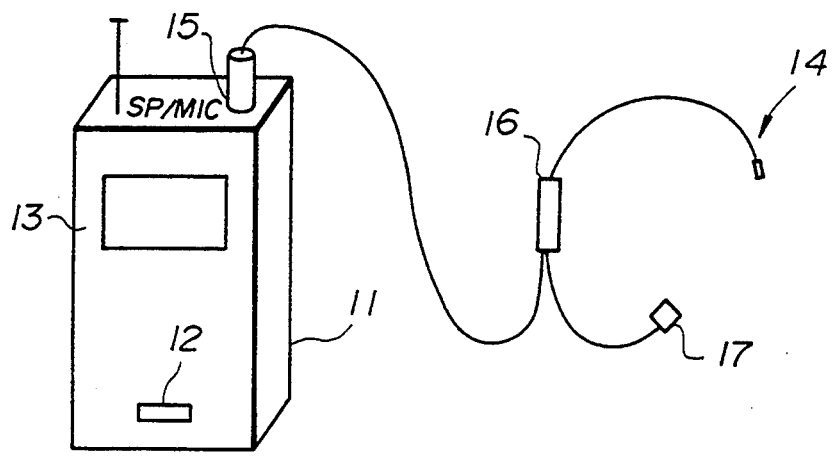
FIG. 1 is a perspective view of an example of a conventional portable radiotelephone with a headphone connected.
Figure 2:
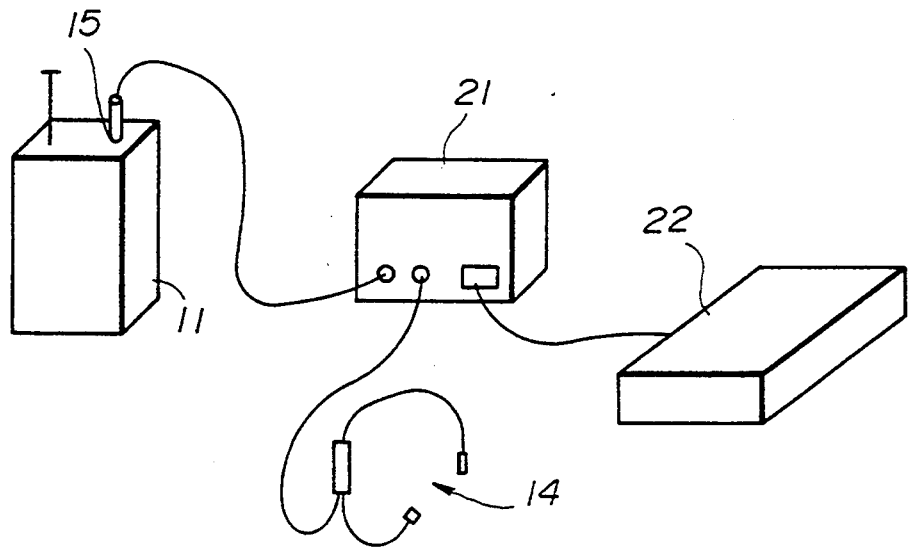
FIG. 2 is a perspective view of the portable radiotelephone of FIG. 1, a NCU and a facsimile machine connected so as to perform facsimile communication.
Figure 3:
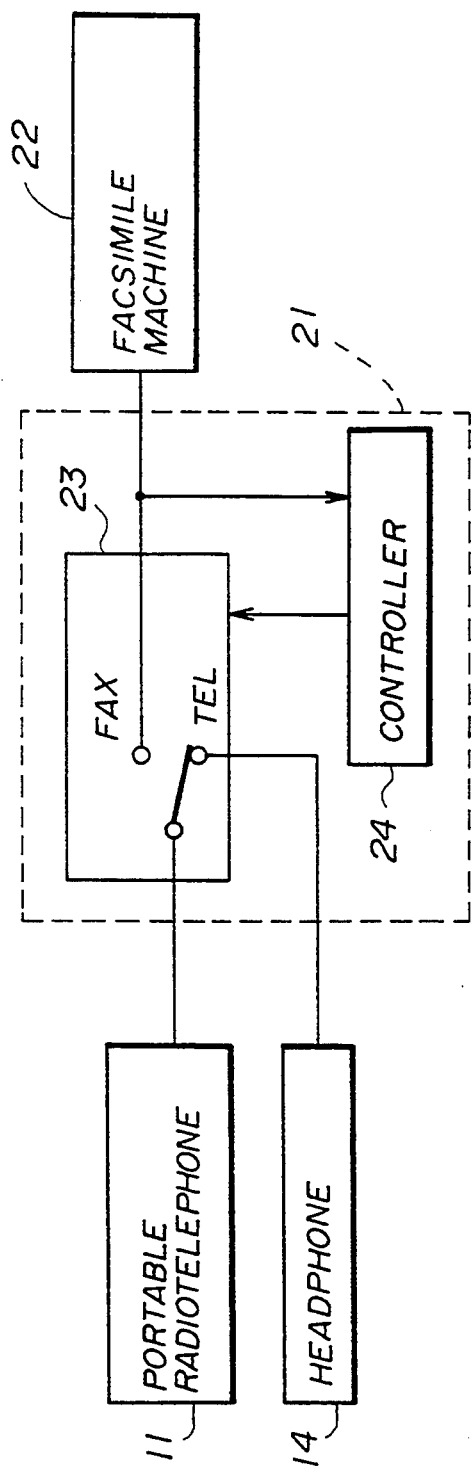
FIG. 3 is a block diagram of a part of the NCU 21 which performs a switching of TEL/FAX functions.
Figure 4:
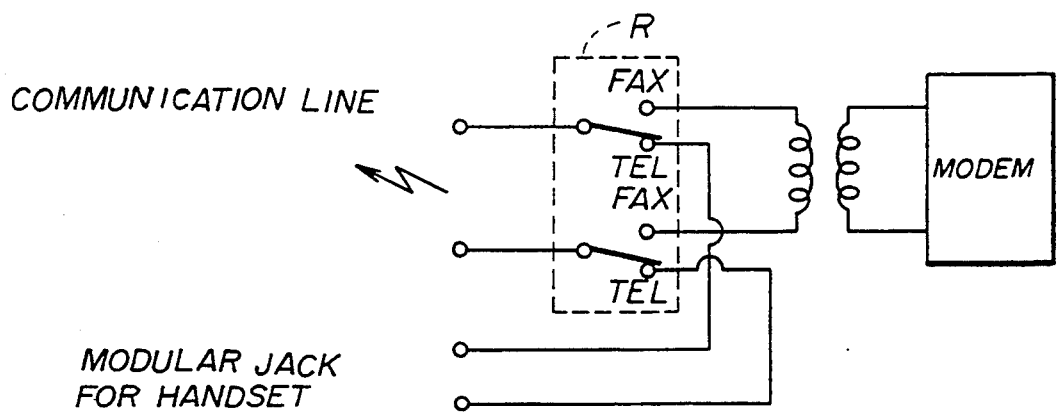
FIG. 4 is a circuit diagram of a conventional facsimile machine.
Figure 5:
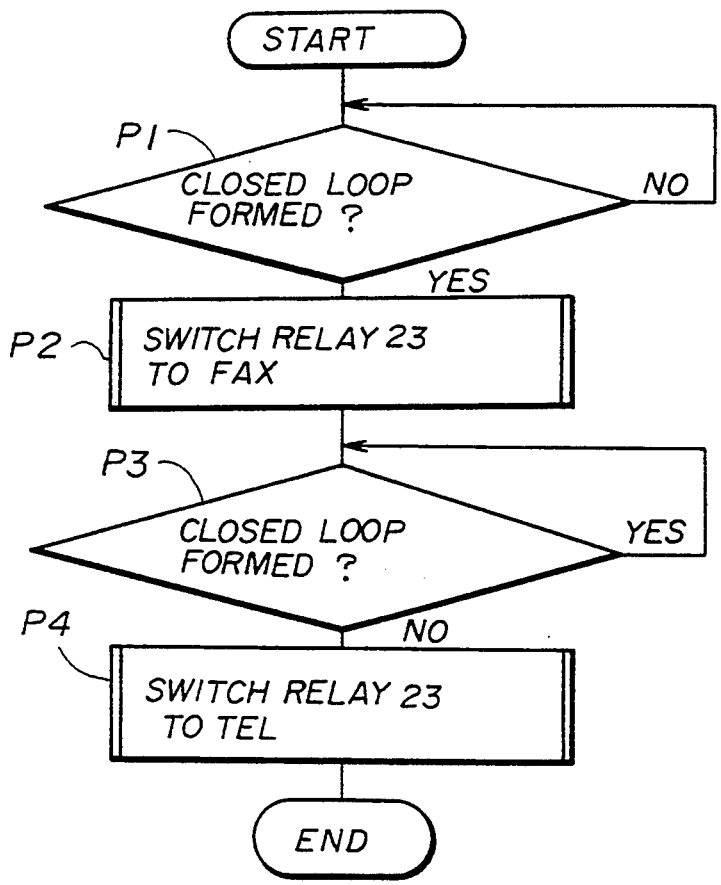
FIG. 5 is a flow chart of a switching function performed by the NCU of FIG. 2.
Figure 6:
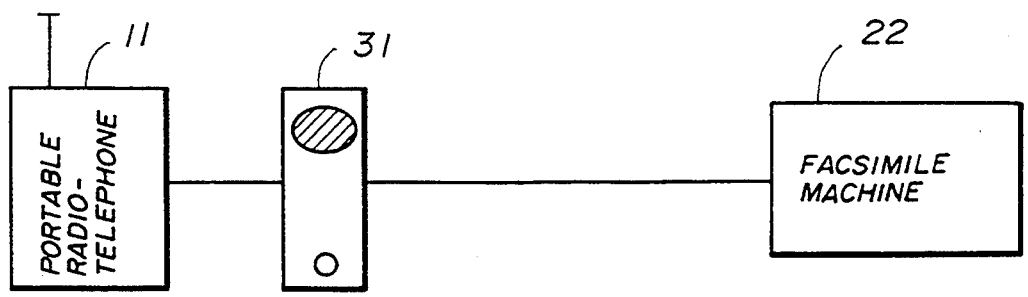
FIG. 6 is a schematic diagram of a handset of the present invention connected between a portable radiotelephone and a facsimile machine.

A description will now be given, with reference to FIG. 6 and FIG. 7, of an embodiment of the present invention. As shown in FIG. 6, a handset 31 according to the present invention is connected between a portable radiotelephone 11, an end terminal of a mobile communication system, and a facsimile machine 22, a data communication end terminal. The handset 31 connects a speaker signal line and a microphone signal line to the facsimile machine 22 via a speaker/microphone terminal provided on the handset 31, as the same manner shown in FIG. 2.

Figure 7:
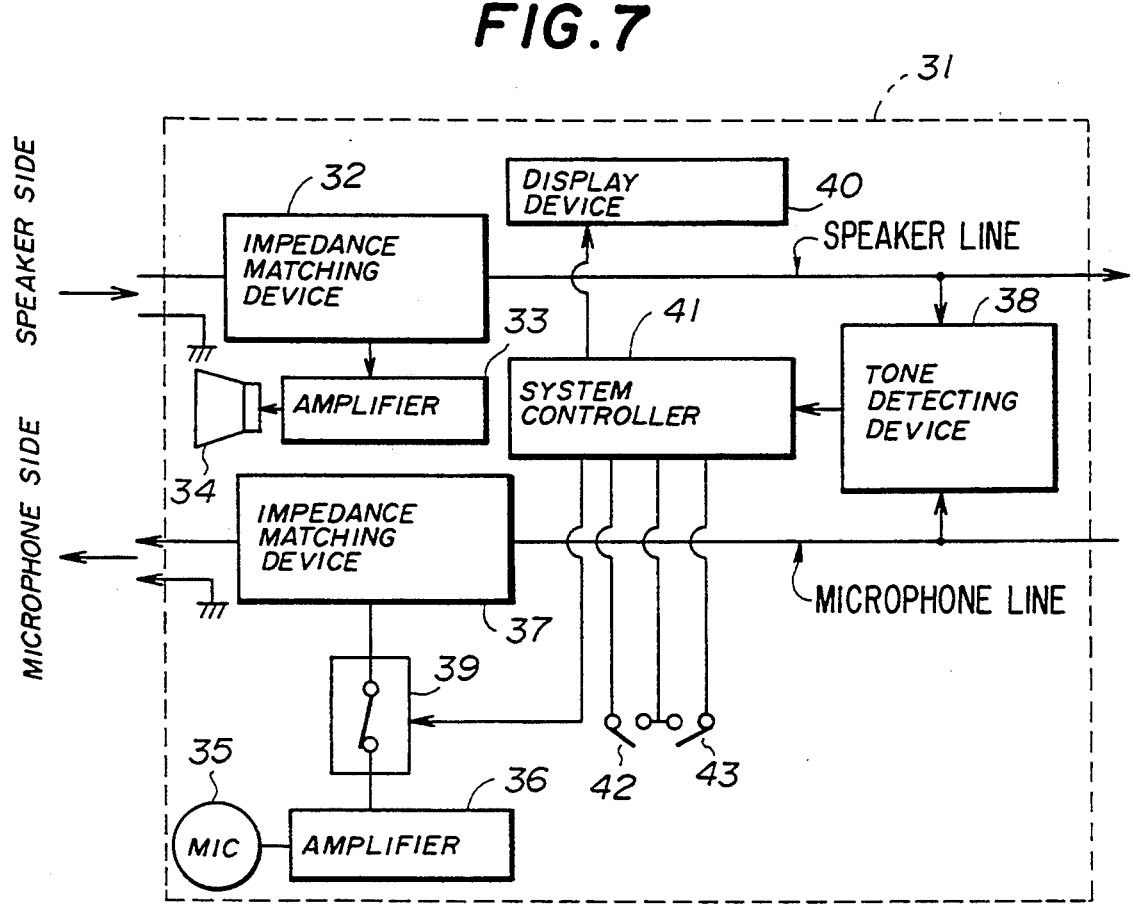
FIG. 7 is a block diagram of the handset of FIG. 6.

The handset 31 has circuitry as shown in FIG. 7. On the speaker signal line, there is provided an impedance matching device 32, so as to detect a reception signal from a speaker terminal of the portable radiotelephone 11 with a minimum power loss of signals. A signal output from the impedance matching device 32 is amplified by an amplifier 33 and provided to a speaker 34 to be converted into audio sound.

On the other hand, sound converted into a sound signal by the microphone 35 is provided to a microphone terminal provided on the portable radiotelephone 11, through the microphone signal line. There are provided, on the microphone line, an amplifier 36 which amplifies the audio signal and an impedance matching device 37 in the same manner as with the speaker signal line.

A tone detecting device 38 detects a presence or absence of data signal on the speaker and microphone signal lines, which signal is generated from one's own facsimile machine 22 or the remote facsimile machine. The signal detected by the tone detecting device 38 may be communication-start protocol data or communication-end protocol data.

A relay 39, as an on/off circuit device, connects the microphone 35 to the microphone signal line when the tone detecting device 38 does not detect a data communication signal, and disconnects it when the device 38 detects a data communication signal. If the relay 39 connects the microphone 35 to the microphone signal line after it has already been disconnected, connection is made only when no data communication signal is detected for a predetermined period of time. When the signal is for facsimile communication, the relay 39 connects the microphone 35 to the microphone signal line when the tone detecting device 38 detects communication-end protocol data, and disconnects it when the device 38 detects communication-start protocol data.

A display device 40, as a notifying means, comprises, for example, a LCD (liquid crystal display), and notifies a user that facsimile communication, that is, not telephone communication, is being performed when facsimile communication protocol data is detected by the tone detecting device 38. The display device may display corresponding operation instructions in accordance with the detected protocol data.

A system controller 41 is provided for controlling functions of the handset 31. The system controller 41 controls an on/off operation of the relay 39 in accordance with the signal detected by the tone detecting device and controls the operation of the display on tile display device 40. In the mean time, the relay 39 can be manually operated by a set switch 42 and a reset switch 43, that is, telephone communication and facsimile communication can be switched by manual operation.

The impedance matching devices 32 and 37 further include functions performed by the conventional NCU, such as two-wire/four-wire conversion, transmission level adjustment, and reception level adjustment. However, by having the conventional NCU between the handset 31 and the facsimile machine 22, those functions can be left to the NCU. In this case, the function of the handset 31 will be simplified.

The handset 31 is desired to include a battery cell, not shown in the figure, in order to drive circuits for tile above mentioned functions.

Figure 8:
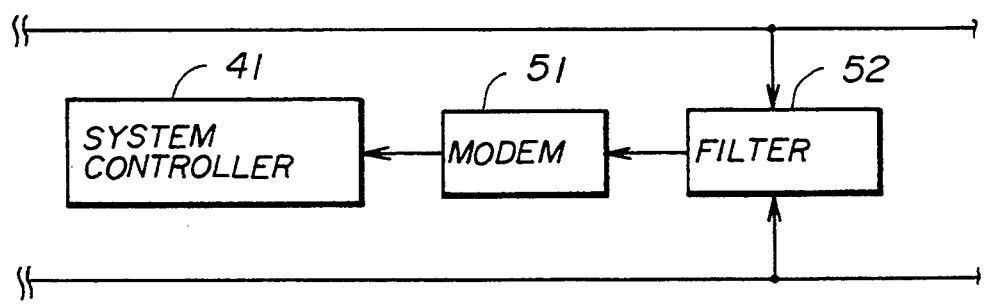
FIG. 8 is a block diagram of a variation of a detecting means.

FIG. 8 is a block diagram of a variation of the detecting means. In this variation, the above mentioned tone detecting device 38 is replaced by a modem 51 and a filter 52. Communication data, such as start- or end-protocol data, is detected by the modem 51, and the filter 52 eliminates unnecessary frequency bands for the protocol data. Thus, higher accuracy of detection can be obtained.

Figure 9:
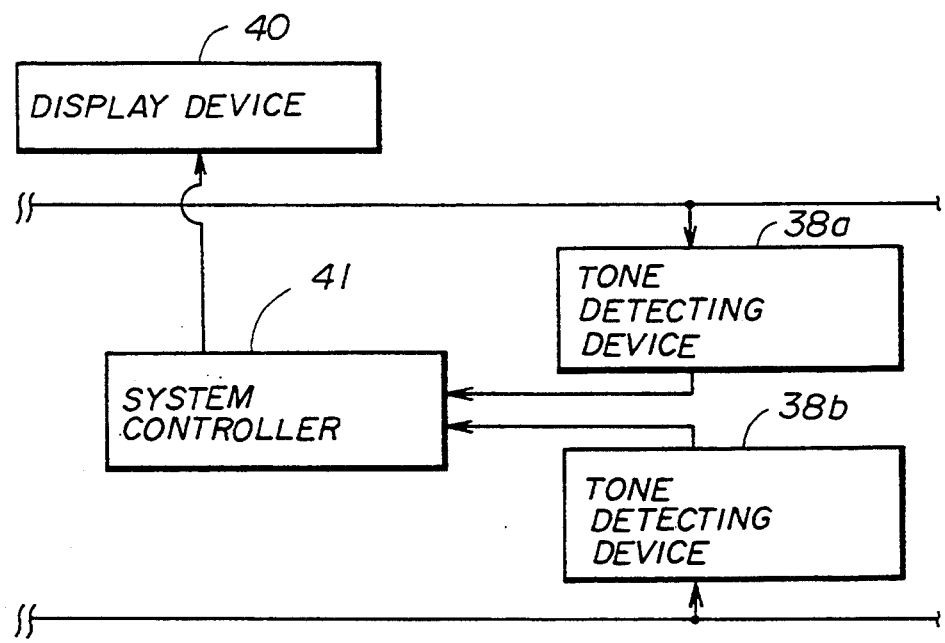
FIG. 9 is a block diagram of another variation of a detecting means.

FIG. 9 is a block diagram of another variation of the detecting means. Tone detecting devices 38a and 38b are respectively provided to the speaker and microphone signal lines. This construction enables making a judgment concerning in which line the protocol data is detected. In other words, the tone detecting device 38b, provided on the microphone signal line, detects the protocol data sent by one's own facsimile machine and the tone detecting device 38a, provided on the speaker line, detects the protocol data sent by the remote facsimile machine. Accordingly, the system controller 41 can recognize the function being performed, transmission or reception; this allows conducting detailed guidance of a user, for operation of the facsimile machine, through the display device 40.

A description will now be given of an operation of the handset 31. FIG. 10 is a flow chart of a communication procedure of a first embodiment of the present invention. In step S1, a user connects the portable radiotelephone 11, the facsimile machine 22, and the handset 31 such as described in FIG. 6. In step S2, the user makes telephone conversation by means of the handset 31, and then, in step S3, he judges which is being performed, transmission or reception. If transmission will be made by the facsimile machine 22, in step S4, a material to be sent is set in the facsimile machine. If reception will be made from the remote facsimile machine, a start button, not shown in the figure, is activated on the facsimile machine 22 in step S5.

Next, in step S6, when CED (called station identification: 2100 kHz) is generated, the CED is detected by the tone detecting device 38. In step S7, the microphone 36 is disconnected from the microphone signal line by operation of the relay 39. In step S8, it is judged whether or not an absence of facsimile communication protocol data is detected for 10 seconds. If no protocol data is detected for 10 seconds, the procedure proceeds to step S9 where the relay 39 is operated in order to reconnect the microphone 35 to the microphone signal line. After the microphone 35 is connected, telephone conversation is continued, in step S10, and then the procedure ends.

As mentioned above, since a microphone 35 is turned on and off according to the presence or absence of a data communication signal, telephone communication and facsimile communication can be automatically switched on or off, as needed. Accordingly, sound signals generated by the microphone 35 of the handset 31 are not mixed into data communication signals while data communication is performed, and monitoring of the communication can be done by means of the speaker 34 provided on the handset 31. Thus, telephone conversation and facsimile communication can be performed while the handset 31 and the facsimile machine 22 are connected to the portable radiotelephone 11; resulting in improved operation of the facsimile machine 22 connected to the portable radiotelephone 11.

FIG. 11 is a flow chart of a communication procedure of a second embodiment of the present invention. In step T1, a user connects the portable radiotelephone 11, the facsimile machine 22 and the handset 31 according to the present invention, such as described in FIG. 6. In step T2, the user conducts telephone conversation by means of the handset 31, and then, in step T3, judges which is being performed, transmission or reception. If transmission will be made by means of the facsimile machine 22, a material to be sent is set in the facsimile machine in step T4. If reception will take place of a material sent by the remote facsimile machine, a start button, not shown in the figure, is activated on the facsimile machine 22 in step T5. Next, in step T6, when CED (called station identification: 2100 kHz) is generated, the CED is detected by the tone detecting device 38. In step T7, the microphone 36 is disconnected from the microphone signal line by having the relay 39 operated. In step T8, it is judged whether or not protocol data, such as a disconnect signal (DCN) that signals the end of facsimile communication is generated by one's own facsimile machine 22 or the remote facsimile machine. If DCN is detected by the tone detecting device 38, the procedure proceeds to step T9, where the relay 39 is operated, in order to reconnect the microphone 35 to the microphone signal line. After the microphone 35 is connected, telephone conversation is continued, in step T10, and then the procedure ends.

As mentioned above, since the microphone 35 is turned on and off according to the detection of the start and end signals of protocol data such as facsimile communication protocol data, telephone communication and facsimile communication can be automatically switched. Accordingly, sound signals generated by the microphone 35 of the handset 31 are not mixed into the data communication signal while data communication is performed, and monitoring of the communication can be done by means of the speaker 34 provided on the handset 31. Thus, telephone conversation and facsimile communication can be performed while the handset 31 and the facsimile machine 22 are connected to the portable radiotelephone 11; this results in improved operation of the facsimile machine 22 connected to the portable radiotelephone 11.

Further, by independently detecting a signal on either the speaker or the microphone signal line, by the construction shown in FIG. 9, protocol data for facsimile communication can be detected with high accuracy, and telephone conversation and facsimile communication can be activated precisely, as needed.

FIGS. 12A, 12B, 12C are views showing examples of instructions displayed on a displaying device. In FIG. 12A, there is shown an example of instructions displayed on the display device 40 when protocol data of facsimile communication is detected by the tone detecting device 38 either on the speaker signal line or on the microphone signal line. According to this feature, since a user can recognize, by the display, that the opponent is sending facsimile communication data during a telephone conversation, an operation of the facsimile machine 22 connected to the portable radiotelephone can be improved.

In FIG. 12B, there is shown an example of an instruction displayed on the display device 40 when the remote unit is the receiving side of the facsimile communication. This instruction can be displayed when CED of facsimile communication is detected on the speaker signal line by adopting two independent tone detecting devices 38a and 38b.

FIG. 12C is an example of an instruction displayed on the display device 40 when one's own facsimile machine 22 is the receiving side of the facsimile communication. This instruction can be displayed when CED of facsimile communication is detected on the microphone signal line by adopting two independent tone detecting devices 38a and 38b.

As mentioned above, by means of the embodiment having two independent detecting devices, an instruction of operation of the facsimile machine 22 can be displayed in response to a facsimile communication situation. Thus, an improved operation can be obtained of the facsimile machine 22, connected to the portable radiotelephone.

It is to be noted that although the facsimile machine 22 adopted a data communication end terminal in the above mentioned embodiment, other data communication apparatuses such as a personal computer having a communication function, a static picture sending apparatus, or a photograph sending apparatus can also be used with the present invention. Additionally, although in the above mentioned embodiment a portable radiotelephone is adopted as a mobile communication system, the present invention can also be applied to an automobile telephone.

The present invention is not limited to the specifically disclosed embodiments, and variations and modifications may be made without departing from the scope of the present invention.

What is claimed is:

1. An externally attached handset, connected between an end terminal of a mobile communication system having a speaker/microphone terminal by which an externally attached speaker and microphone are connected and a data communication end terminal connected to the end terminal of the mobile communication system via the speaker/microphone terminal, which handset comprises:

a speaker signal line connecting said end terminal of said mobile communication system to said data communication end terminal via said speaker/microphone terminal;

a microphone signal line connecting said end terminal of said mobile communication system to said data communication end terminal via said speaker/microphone terminal;

a speaker, connected to said speaker signal line, converting a signal on the speaker signal line into an audio sound;

a microphone, connected to said microphone signal line, converting a sound into a sound signal and supplying the sound signal to said microphone signal line;

detecting means for detecting a called station identification signal and a data communication signal including a data communication protocol signal on said speaker signal line and on said microphone signal line; and an on/off circuit device, connected between said microphone and said microphone signal line, disconnecting said microphone from said microphone signal line when said called station identification signal is detected by said detecting means on said speaker signal line or on said microphone signal line, said on/off circuit device reconnecting said microphone to said microphone signal line while said microphone is disconnected and when said data communication signal has not been detected by said detecting means for a predetermined period of time.

2. The handset as claimed in claim 1, wherein said detecting means comprises a tone detecting device connected to both said speaker signal line and said microphone signal line.

3. The handset as claimed in claim 1, wherein said detecting means is independently provided to both said speaker signal line and said microphone signal line.

4. The handset as claimed in claim 1, further comprising a notifying means for notifying a user that said call identification signal is detected by said detecting means.

5. The handset as claimed in claim 4, wherein said notifying means comprises a character displaying device, which displaying device displays a detection of said call identification signal and also displays an instruction of an operation procedure of said data communication end terminal.

6. The handset as claimed in claim 1, further including a manually operated switch which switches said on/off circuit device to a state where said microphone is disconnected from said microphone signal line.

7. The handset as claimed in claim 1, wherein said detecting means comprises first and second tone detecting devices, the first tone detecting device being connected to said speaker signal line and the second tone detecting device being connected to said microphone line, so as to determine whether said data communication end terminal is performing a transmitting operation or a receiving operation.

8. The handset as claimed in claim 7, further comprising a notifying means for notifying a user that said data communication end terminal is performing a transmitting operation or a receiving operation in accordance with a result of a detection performed by said first and second tone detecting devices.

9. An externally attached handset, connected between an end terminal of a portable radiotelephone having a speaker/microphone terminal by which an externally attached speaker and microphone are connected and a facsimile machine connected to the portable radiotelephone via the speaker/microphone terminal, which handset comprises:
  a speaker signal line connecting said portable radiotelephone to said facsimile machine via said speaker/microphone terminal;
  a microphone signal line connecting said portable radiotelephone to said facsimile machine via said speaker/microphone terminal;
  a speaker, connected to said speaker signal line, converting a signal on the speaker signal line into an audio sound;
  a microphone, connected to said microphone signal line, converting a sound into a sound signal and supplying the sound signal to said microphone signal line;
  detecting means for detecting a data communication signal and a data communication protocol signal, including a communication-start protocol signal and a communication-end protocol signal, on said speaker signal line and on said microphone signal line; and
  an on/off circuit device, connected between said microphone and said microphone signal line, disconnecting said microphone from said microphone signal line when said communication-start protocol signal for facsimile communication is detected by said detecting means, connecting said microphone to said microphone signal line when said communication-end protocol signal is detected by said detecting means, said on/off circuit device reconnecting said microphone to said microphone signal line while said microphone is disconnected and when said data communication signal has not been detected by said detecting means for a predetermined period of time.

10. The handset as claimed in claim 9, wherein said detecting means comprises a tone detecting device connected to both said speaker signal line and said microphone signal line.

11. The handset as claimed in claim 9, wherein said detecting means is independently provided to both said speaker signal line and said microphone signal line.

12. The handset as claimed in claim 9, wherein said detecting means comprises a filter connected to said speaker signal line and said microphone signal line, and a modem connected to said filter.

13. The handset as claimed in claim 9, further comprising a notifying means for notifying a user that said communication-start protocol signal is detected by said detecting means.

14. The handset as claimed in claim 13, wherein said notifying means comprises a character displaying device which displays a detection of said communication-start protocol signal and also displays an instruction of an operation procedure of said facsimile machine.

15. The handset as claimed in claim 9, further including a manually operated switch which switches said on/off circuit device to a state where said microphone is disconnected from said microphone signal line.

16. The handset as claimed in claim 9, wherein said detecting means comprises first and second tone detecting devices, the first tone detecting device being connected to said speaker signal line and the other second tone detecting device being connected to said microphone line, so as to determine whether said facsimile machine is performing a transmitting operation or a receiving operation.

17. The handset as claimed in claim 16, further comprising a notifying means for notifying a user that said facsimile machine is performing a transmitting operation or a receiving operation in accordance with a result of a detection performed by first and second tone detecting devices.

* * * * *